United States Patent
Xu

(10) Patent No.: US 7,685,448 B2
(45) Date of Patent: Mar. 23, 2010

(54) COMPUTER SYSTEM SLEEP/AWAKE CIRCUIT

(75) Inventor: Feng Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 499 days.

(21) Appl. No.: 11/608,804

(22) Filed: Dec. 9, 2006

(65) Prior Publication Data

US 2008/0077810 A1    Mar. 27, 2008

(30) Foreign Application Priority Data

Sep. 27, 2006   (CN)   ................. 2006 1 0062829

(51) Int. Cl.
  *G06F 1/26* (2006.01)
  *G06F 1/32* (2006.01)
(52) U.S. Cl. .................. 713/323; 713/300; 713/320; 705/14; 186/59
(58) Field of Classification Search .................. 713/323, 713/300, 320; 705/14; 186/59
  See application file for complete search history.

(56) References Cited

U.S. PATENT DOCUMENTS

| 6,584,573 | B1 | 6/2003 | Wunderlich et al. |
| 7,010,710 | B2 * | 3/2006 | Piazza .................. 713/323 |
| 2003/0115096 | A1 * | 6/2003 | Reynolds et al. ............ 705/14 |
| 2006/0140452 | A1 * | 6/2006 | Raynor et al. ............ 382/115 |

FOREIGN PATENT DOCUMENTS

CN   1286428 A   3/2001

\* cited by examiner

*Primary Examiner*—Thomas Lee
*Assistant Examiner*—Michael J Brown
(74) *Attorney, Agent, or Firm*—Wei Te Chung

(57) ABSTRACT

A computer system sleep/awake circuit includes an infrared sensor for detecting a presence or absence of a user before a display of the computer system, and outputting a corresponding detecting result; a time circuit connected to the infrared sensor for receiving the detecting result and outputting a corresponding result after a certain delaying time; and a control circuit connected to both the infrared sensor and the time circuit for receiving the detecting result from the infrared sensor and the delayed result from the time circuit, and electrically connected to a control board of the computer system for outputting a corresponding control signal to control sleep/awake states of the computer system.

7 Claims, 1 Drawing Sheet

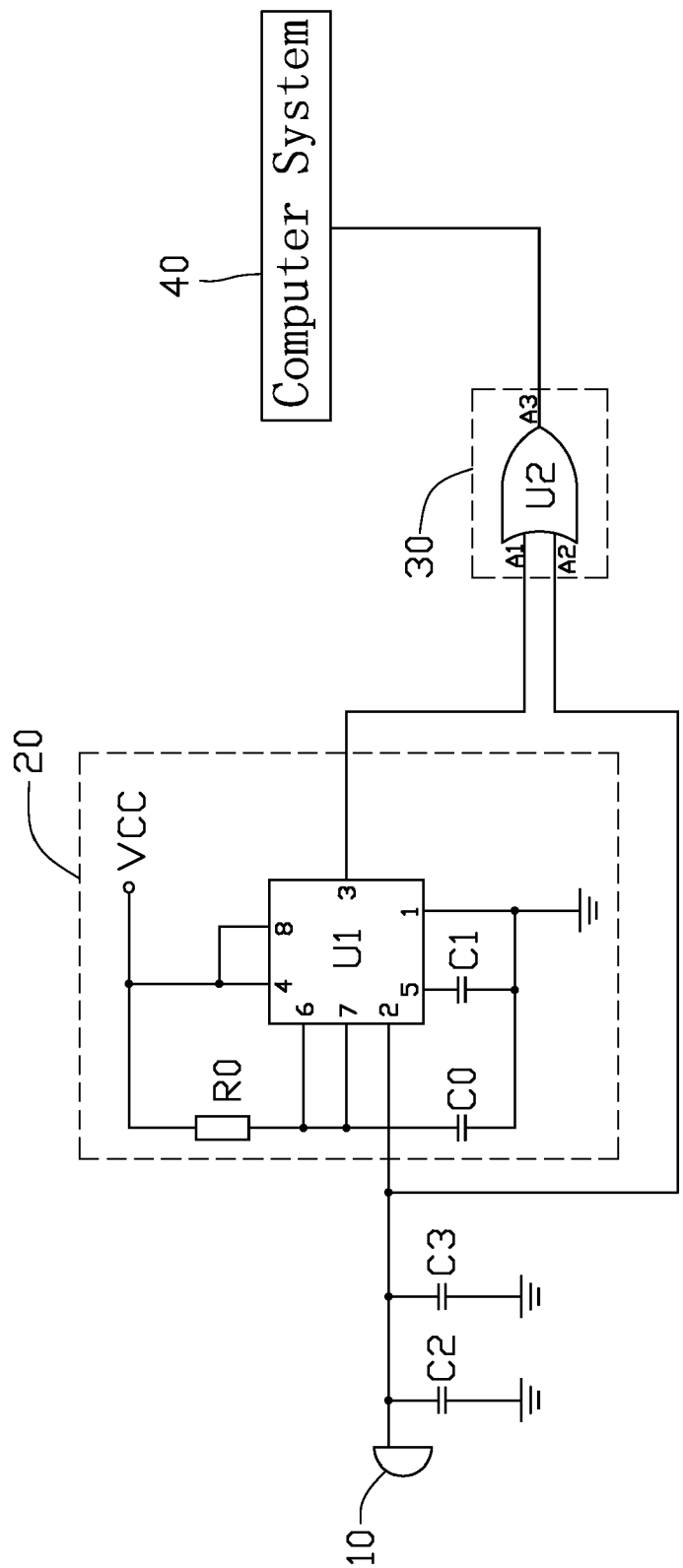

COMPUTER SYSTEM SLEEP/AWAKE CIRCUIT

BACKGROUND OF THE INVENTION

1. Field of the Invention

The present invention relates to a sleep/awake circuit, and more particularly to a circuit for automatically setting a sleep/awake state of a computer system.

2. Description of Related Art

With the rapid development of personal computers, development of high performance components of a computer have brought about a corresponding increase in power use. Therefore power waste becomes an issue of greater importance if a computer system is not changed to a power saving state when not in use.

Typically, a sleep/awake circuit will place a computer system in a power saving mode after a delay time has elapsed in which the computer system has not been used. A lack of use is usually determined according to time elapsed since a keyboard or mouse of the computer system has been used. There is usually a sleep/awake button on the keyboard so that a user may manually activate or deactivate the power saving mode. However, power may still be wasted if the user does not manually activate the power saving mode when he or she is done, which allows power consuming processes to continue in the computer system until the delay time has elapsed.

What is desired, therefore, is a sleep/awake circuit for automatically activating or deactivating a power saving mode according to a presence of a user or lack thereof.

SUMMARY OF THE INVENTION

In one preferred embodiment, a computer system sleep/awake circuit includes an infrared sensor for detecting a presence or absence of a user before a display of the computer system, and outputting a corresponding detecting result; a time circuit connected to the infrared sensor for receiving the detecting result and outputting a corresponding result after a certain delaying time; and a control circuit connected to both the infrared sensor and the time circuit for receiving the detecting result from the infrared sensor and the delayed result from the time circuit, and electrically connected to a control board of the computer system for outputting a corresponding control signal to control sleep/awake states of the computer system.

Other advantages and novel features will become more apparent from the following detailed description of preferred embodiments when taken in conjunction with the accompanying drawing, in which:

BRIEF DESCRIPTION OF THE DRAWING

The drawing is a circuit diagram of a computer system sleep/awake circuit in accordance with a preferred embodiment of the present invention.

DETAILED DESCRIPTION OF THE INVENTION

Referring to the drawing, a computer system sleep/awake circuit of a preferred embodiment of the present invention includes an infrared sensor 10, a time circuit 20, and a control circuit 30. The infrared sensor 10 automatically detects a presence or absence of a user before a display, and outputs a corresponding detecting result to both the time circuit 20 and the control circuit 30. The time circuit 20 receives the detecting result, and outputs a corresponding result to the control circuit 30 after a certain delaying time. According to results from both the infrared sensor 10 and the time circuit 20, the control circuit 30 sends a corresponding control signal to a control board of a computer system 40 for controlling sleep/awake states of the computer system 40.

The infrared sensor 10 may be any one of a suitable infrared device that is Infrared Data Association compliant and connectable to the computer system 40, for detecting a human presence and is positioned on or about the computer system 40 so that it may detect a presence or absence of the user. In the preferred embodiment of the present invention, the infrared sensor 10 is set at a low position on or near a display of the computer system 40 or positioned on or near the computer system 40.

The time circuit 20 includes a timer U1, a resistor R0, a capacitor C0, and a first filter capacitor C1. In the preferred embodiment of the present invention, the timer U1 is a 555 timer. The resistor R0 and the capacitor C0 determine a delaying time T of the timer U1. The delaying time T of the timer U1 is R0*C0. An earth Pin 1 of the timer U1 is grounded. A first trigger pin 2 of the timer U1 is connected to an output terminal of the infrared sensor 10. The output terminal of the infrared sensor 10 is also grounded via a second filter capacitor C2, and a third filter capacitor C3 to make outputting of the infrared sensor 10 steady. A reset pin 4, and a power pin 8 of the timer U1 are connected to batteries directly or a system power VCC of the computer system 40 via a power connector. A voltage control pin 5 is grounded via the first filter capacitor C1. A second trigger pin 6 is coupled to the system power VCC via the resistor R0. The second trigger pin 6, and a discharge-pin 7 are grounded via the capacitor C0.

The control circuit 30 is an OR gate circuit U2. A first input pin A1 of the OR gate circuit U2 is connected to an output pin 3 of the timer U1. A second input pin A2 of the OR gate circuit U2 is coupled to the output terminal of the infrared sensor 10. An output pin A3 of the OR gate circuit U2 is connected to a basic input/output pin of the control board of the computer system 40 for controlling sleep/awake states of the computer system 40. If both the first and second input pins A1, A2 of the OR gate circuit U2 are low, the output pin A3 of the OR gate circuit U2 turns to low. If either the first input pin A1 or the second input pin A2 of the OR gate circuit U2 is high, the output pin A3 of the OR gate circuit U2 is high. The OR gate circuit U2 can be other kinds of circuits having the same function.

When working, the infrared sensor 10 emits infrared detecting signals directed at a space that would normally be occupied by the user when at the computer. If the infrared sensor 10 fails to receive reflected signals, then the user of the computer has left, and a low level signal is sent to both the first trigger pin 2 of the timer U1 and the second input pin A2 of the OR gate circuit U2. After the delaying time T, the first input pin A1 of the OR gate circuit U2 receives the low level signal from the output pin 3 of the timer U1, and then the low level signal of the output pin A3 of the OR gate circuit U2 is received by the basic input/output pin of the control board of the computer system 40 to put the computer system 40 in a sleep state even though the user does not manually activate a power saving mode when he or she is done. At the same time, the infrared detecting process continues. When the presence of the user is detected by the infrared sensor 10 receiving reflected signals, the infrared sensor 10 sends a high level signal to the second input pin A2 of the OR gate circuit U2. A high level signal from the output pin A3 of the OR gate circuit U2 is received by the basic input/output pin of the computer system 40 to automatically put the computer system 40 in an awake state.

It is to be understood, however, that even though numerous characteristics and advantages of the preferred embodiments have been set forth in the foregoing description, together with details of the structures and functions of the embodiments, the disclosure is illustrative only, and changes may be made in detail, especially in matters of shape, size, equivalent material and arrangement of parts within the principles of the invention to the full extent indicated by the broad general meaning of the terms in which the appended claims are expressed.

What is claimed is:

1. A computer system sleep/awake circuit comprising:
   an infrared sensor for detecting a presence or absence of a user before a display of the computer system, and outputting a corresponding detecting result;
   a time circuit connected to the infrared sensor for receiving the detecting result and outputting a corresponding result after a certain delaying time, wherein the time circuit comprises a timer comprising:
   an earth pin grounded;
   a first trigger pin connected to an output terminal of the infrared sensor;
   a second trigger pin coupled to a system power via a resistor and grounded via a capacitor;
   a discharge-pin grounded via the capacitor;
   a reset pin and a power pin connected to the system power; and
   a voltage control pin grounded via a first filter capacitor; and
   a control circuit connected to both the infrared sensor and the time circuit for receiving the detecting result from the infrared sensor and the delayed result from the time circuit, and electrically connected to a control board of the computer system for outputting a corresponding control signal to control sleep/awake states of the computer system.

2. The computer system sleep/awake circuit as claimed in claim 1, wherein the output terminal of the infrared sensor is grounded via a second filter capacitor, and a third filter capacitor.

3. The computer system sleep/awake circuit as claimed in claim 1 wherein the timer is a 555 timer.

4. The computer system sleep/awake circuit as claimed in claim 1, wherein the control circuit is an OR gate circuit, two input pins of the OR gate circuit are respectively connected to the output terminal of the infrared sensor and an output terminal of the timer, an output pin of the OR gate circuit is for connection of a basic input/output pin of a control board of the computer system.

5. The computer system sleep/awake circuit as claimed in claim 4, wherein the infrared sensor is set in the display facing the user.

6. A sleep/awake circuit comprising:
   an infrared sensor for detecting a presence or absence of a user before a display of a computer system, and outputting a corresponding detecting result;
   a time circuit comprising a 555 timer connected to the infrared sensor for receiving the detecting result and outputting a corresponding result after a certain delaying time; and
   a control circuit comprising an OR gate circuit, the OR gate circuit connected to both the infrared sensor and the time circuit for receiving the detecting result from the infrared sensor and the delayed result from the time circuit, and outputting corresponding control signals for controlling sleep/awake states of the computer system.

7. The sleep/awake circuit as claimed in claim 6, wherein the infrared sensor is set in the display facing the user.

\* \* \* \* \*